(12) United States Patent
Ko

(10) Patent No.: US 10,935,840 B2
(45) Date of Patent: Mar. 2, 2021

(54) DISPLAY APPARATUS HAVING OPTICAL LENS

(71) Applicant: Acer Incorporated, New Taipei (TW)

(72) Inventor: Chueh-Pin Ko, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/390,011

(22) Filed: Apr. 22, 2019

(65) Prior Publication Data

US 2020/0201115 A1 Jun. 25, 2020

(30) Foreign Application Priority Data

Dec. 20, 2018 (TW) ................. 107146275 A

(51) Int. Cl.
*G02F 1/1335* (2006.01)
*G09G 3/36* (2006.01)
(Continued)

(52) U.S. Cl.
CPC .. *G02F 1/133602* (2013.01); *G02F 1/133308* (2013.01); *G02F 1/133526* (2013.01);
(Continued)

(58) Field of Classification Search
CPC ........... G09G 3/001–003; G09G 3/007; G09G 3/32–3291; G09G 3/36–3696; G09G 2300/0439; G09G 2300/0443; G09G 2300/0452; G09G 2300/0465; G09G 2310/0232; G09G 2320/0233; G09G 2320/028; G09G 2340/0407–0428; G09G 2340/0442; G09G 2340/0457; G09G 2340/14; G09G 2340/145; G02F 1/133308; G02F 1/133526; G02F 1/133602–133604; G02F 1/133606; G02F 2001/133314–13332; G02F 2001/133331; G02F 2001/133607

See application file for complete search history.

(56) References Cited

U.S. PATENT DOCUMENTS 6,927,908 B2 * 8/2005 Stark .................... G02F 1/13336
345/1.3
7,663,715 B2 2/2010 Jin et al.
(Continued)

FOREIGN PATENT DOCUMENTS

CN 207895782 9/2018

*Primary Examiner* — Nathan Danielsen
(74) *Attorney, Agent, or Firm* — JCIPRNET

(57) ABSTRACT

A display apparatus including a display element, a frame body, and an optical lens is provided. The display element has a central zone and at least one edge zone located around the central zone. The central zone forms a display surface with at least one edge zone. The frame body has a bezel portion and an accommodating space. The display element is disposed in the accommodating space and the bezel portion surrounds the display element. The optical lens is disposed on the display element and includes a body. The body has a flat portion and at least one extending portion around the flat portion, wherein the at least one extending portion has a feature surface, and the feature surface overlaps the at least one edge zone and the bezel portion in the direction perpendicular to the frame body, so that users can experience a bezel-less visual effect.

14 Claims, 5 Drawing Sheets

(51) Int. Cl.
*G09G 3/3208* (2016.01)
*G02F 1/1333* (2006.01)
*G02F 1/13357* (2006.01)
*G09G 3/00* (2006.01)

(52) U.S. Cl.
CPC ........... *G09G 3/007* (2013.01); *G09G 3/3208* (2013.01); *G09G 3/36* (2013.01); *G09G 2320/0233* (2013.01); *G09G 2320/0686* (2013.01)

(56) References Cited

U.S. PATENT DOCUMENTS

| | | | |
|---|---|---|---|
| 9,568,800 B1* | 2/2017 | Sprague | G02F 1/167 |
| 2009/0103191 A1* | 4/2009 | Xun | G02B 5/045 |
| | | | 359/742 |
| 2010/0053028 A1* | 3/2010 | Hu | G02F 1/13336 |
| | | | 345/1.3 |
| 2010/0259566 A1* | 10/2010 | Watanabe | G02B 3/08 |
| | | | 345/690 |
| 2011/0109535 A1* | 5/2011 | Watanabe | G02F 1/133526 |
| | | | 345/87 |
| 2011/0242686 A1* | 10/2011 | Watanabe | G02B 17/0884 |
| | | | 359/804 |
| 2014/0218956 A1* | 8/2014 | Wu | G02F 1/13336 |
| | | | 362/554 |
| 2016/0366379 A1 | 12/2016 | Hickl | |
| 2020/0004490 A1* | 1/2020 | Chen | G06F 3/1446 |

\* cited by examiner

DISPLAY APPARATUS HAVING OPTICAL LENS

CROSS-REFERENCE TO RELATED APPLICATION

This application claims the priority benefit of Taiwan application Ser. No. 107146275, filed on Dec. 20, 2018. The entirety of the above-mentioned patent application is hereby incorporated by reference herein and made a part of this specification.

BACKGROUND

Technical Field

The disclosure relates to an electronic apparatus, and in particular to a display apparatus.

Description of Related Art

To expand a display image to obtain a better visual effect, one of the existing method is to piece multiple displays together to form a giant display apparatus, and split the whole display image into multiple sub display images corresponding to the number of displays to form a complete display image with each display showing the corresponding sub display image. However, apart from the high cost, such a method has a defect of difficult storage. In addition, the bezel between any two sub displays adjacent to each other may cause the problem of image discontinuity to the whole display image.

The other method is to store two sub displays to the back side of the main display (which is one side opposing the display surface), wherein the orthographic projections of the two sub displays on the main display overlap each other, and the size of any one of the sub displays is substantially the same as the size of the main display, and such a method, therefore, has defects such as overweight and over-thickness of the whole apparatus. Also, after the two sub displays respectively expand along two opposite directions relative to the main display to be pieced together to form a giant display apparatus, the bezel between any one of the sub displays and the main display would still cause the image discontinuity to the whole image.

SUMMARY

The disclosure provides a display apparatus, which allows users to experience a bezel-less visual effect.

A display apparatus of the disclosure includes a display element, a frame body, and an optical lens. The display element has a central zone and at least one edge zone located around the central zone. The central zone forms a display surface with at least one edge zone. The frame body has a bezel portion and an accommodating space. The display element is disposed in the accommodating space and the bezel portion surrounds the display element. The optical lens is disposed on the display element and includes a body. The body has a flat portion and at least one extending portion located around the flat portion, wherein the at least one extending portion has a feature surface, and the feature surface overlaps the at least one edge zone and the bezel portion in the direction perpendicular to the frame body.

In an embodiment of the disclosure, the length of the abovementioned feature surface in the horizontal direction is 3 to 4 times the width of the bezel portion in the horizontal direction.

In an embodiment of the disclosure, the abovementioned display element uses a Cold Cathode Fluorescent Lamp (CCFL), a Mini Light-Emitting Diode (Mini LED), an Organic Light-Emitting Diode (OLED), or Micro Light-Emitting Diode (Micro LED) as a Liquid-Crystal Display (LCD) of the backlight module.

In an embodiment of the disclosure, the abovementioned display element is a Mini LED Liquid-Crystal Display, and the display element has more than 300 light-emitting zones.

In an embodiment of the disclosure, the light-emitting intensity of the abovementioned at least one edge zone is greater than the light-emitting intensity of the central zone, so as to make the flat portion and the at least one extending portion has a brightness that is similarly the same.

In an embodiment of the disclosure, the light-emitting intensity of the abovementioned at least one edge zone and the central zone may be controlled respectively by the backlight module in the display element.

In an embodiment of the disclosure, the abovementioned feature surface is a curved surface and one end of the feature surface closed to the flat portion is away from the display element.

In an embodiment of the disclosure, the abovementioned feature surface is a flat surface, and one end of the feature surface closed the flat portion is closed to the display element.

In an embodiment of the disclosure, the abovementioned optical lens further includes multiple optical microstructures disposed to rank on the feature surface of the at least one extending portion.

In an embodiment of the disclosure, the ranking density of the optical microstructure on the feature surface is gradually increased from one end closed to the flat portion to the end away from the flat portion.

In an embodiment of the disclosure, the abovementioned body is a hollow structure, and there is air between the flat portion and the display element.

In an embodiment of the disclosure, the abovementioned body is glass.

In an embodiment of the disclosure, the abovementioned body is plastic.

In an embodiment of the disclosure, the abovementioned flat portion is glass, and the at least one extending portion is plastic.

In an embodiment of the disclosure, the abovementioned flat portion is a combination of glass and plastic, and the at least one extending portion is plastic.

In an embodiment of the disclosure, the abovementioned optical lens further includes a protective layer disposed to the body, and the body is located between the protective layer and the display element.

Based on the above, in the display apparatus of the disclosure, the optical lens is disposed on the display element, and extending portion of the body of the optical lens has a feature surface which overlaps the edge zone of the display element and the bezel portion of the frame body in the direction perpendicular to the frame body. Thus, the image light emitted by the edge zone may be evenly emitted by the extending portion of the body of the optical lens. Therefore, the image light may be transmitted to the user through the even light-emitting of the optical lens, so as to allow the user to experience the bezel-less visual effect.

In order to make the features and advantages of the disclosure mentioned above more understandable, embodiments will be described in detail below with reference to the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
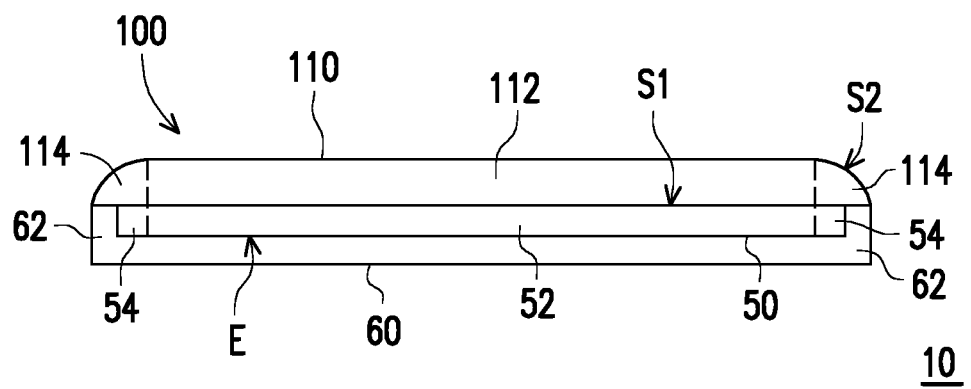
FIG. 1 is a sectional schematic view of a display apparatus according to an embodiment of the disclosure.

FIG. 1 is a sectional schematic view of a display apparatus according to an embodiment of the disclosure. Please refer to FIG. 1. The present embodiment provides a display apparatus 10, including a display element 50, a frame body 60 and an optical lens 100. The display apparatus 10 of the present embodiment may be applied to a general display, a notebook computer, a panel apparatus, or a smart phone, so as to allow the user to experience the bezel-less visual effect. However, the disclosure is not limited hereto.

The display element 50 has a central zone 52 and at least one edge zone 54 around the central zone 52, and the central zone 52 forms a display surface S1 together with the edge zone 54, and the display surface S1 is a light-emitting surface of the image. In the present application, the display element 50 may choose to use the Cold Cathode Fluorescent Lamp (CCFL), Organic Light-Emitting Diode (OLED), Mini Light-Emitting Diode (Mini LED) or Micro Light-Emitting Diode (Micro LED) as the Liquid-Crystal Display (LCD) of the backlight module (not drawn). In a preferable embodiment, the display element 50 serves as a Mini LED Liquid-Crystal Display, but the disclosure is not limited hereto.

The frame body 60 has a bezel portion 62 and an accommodating space E. The display element 50 is disposed in the accommodating space E and the bezel portion 62 surrounds the display element 50. The width of the edge zone 54 of the abovementioned display element 50 in the horizontal direction may be decided according to the width of the bezel portion 62 of the frame body 60 in the horizontal direction. In the present embodiment, the width of the bezel portion 62 of the frame body 60 in the horizontal direction is smaller or equal to 5 mm.

The optical lens 100 is disposed on the display element 50, including a body 110. The body 110 has a flat portion 112 and at least one extending portion 114 located around the flat portion 112. The material of the optical lens 100 may be glass or plastic. Specifically, the optical lens 100 completely covers the display element 50, and overlaps the display element 50 and the frame body 60 in the perpendicular direction. The extending portion 114 has a feature surface S2, which overlaps the edge zone 54 and the bezel portion 62 in the direction perpendicular to the frame body 60. Therefore, the image light emitted by the edge zone 54 of the display element 50 may be evenly emitted by the extending portion 114 of the body 110 in the optical lens 100 to transmit to the user, so as to allow the user to experience the bezel-less visual effect.

Figure 2:
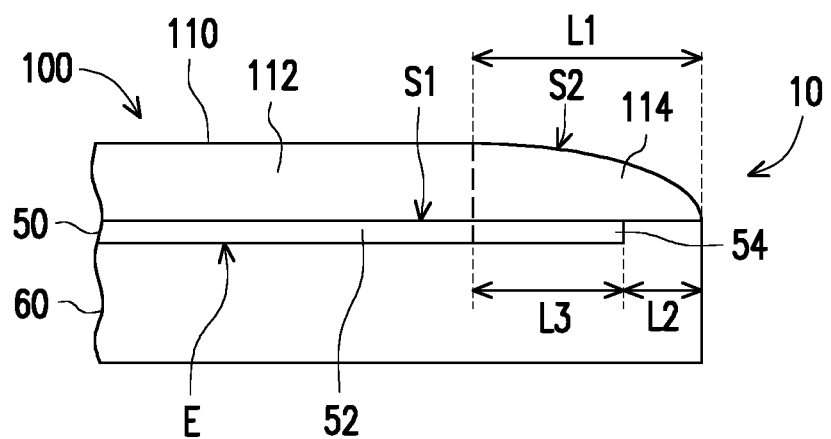
FIG. 2 is a partial enlargement schematic view of an area A in FIG. 1.

FIG. 2 is a partial enlargement schematic view of an area A in FIG. 1. Please refer to FIG. 1 and FIG. 2. Specifically, in the present embodiment, the abovementioned feature surface S2 is a curved surface, and one end of the feature surface S2 closed to the flat portion 112 is away from the display element 50. In other words, the optical lens 100 in the present embodiment is, for example, a convexo-plane optical lens, disposed to the display element 50 and the frame body 60 in a full lamination method. With the curved-surface feature of the feature surface S2 in the extending portion 114, the optical lens 100 evenly emits the refraction of the image light emitted by the edge zone 54 through the light-emitting surface of the extending portion 114. Under the situation that the material is glass, the feature surface S2 of the extending portion 114 may polish and manufacture a specific curvature that simulates optical effects with a physical polishing method according to the simulated optical effect, or use simple chemical etching process. Under the situation that the material is plastic, the feature surface S2 of the extending portion 114 may be manufactured through module ejection technology.

More specifically, in the present embodiment, the length L1 of the feature surface S2 in the horizontal direction is 3 to 4 times the width L2 of the bezel portion 62 of the frame body 60 in the horizontal direction. Take the length L1 of the feature surface S2 in the horizontal direction being 3 times the width L2 of the bezel portion 62 of the frame body 60 in the horizontal direction for example, if the width L2 accounted by the bezel portion 62 is 2.5 mm, the length L1 accounted by the feature surface S2 in the horizontal direction is 7.5 mm, and the length L3 accounted by the edge zone 54 of the display element 50 is the length L1 accounted by the feature surface S2 in the horizontal direction minus the width L2 accounted by the bezel portion 62, which is 5 mm. Therefore, when emitting light, the image light emitted by the edge zone 54 with the accounted width of 5 mm is evenly emitted from the light-emitting surface through the refraction of the extending portion 114 with the accounted length of 7.5 mm in the optical lens 100. Therefore, the user may experience the bezel-less visual effect.

Figure 3:
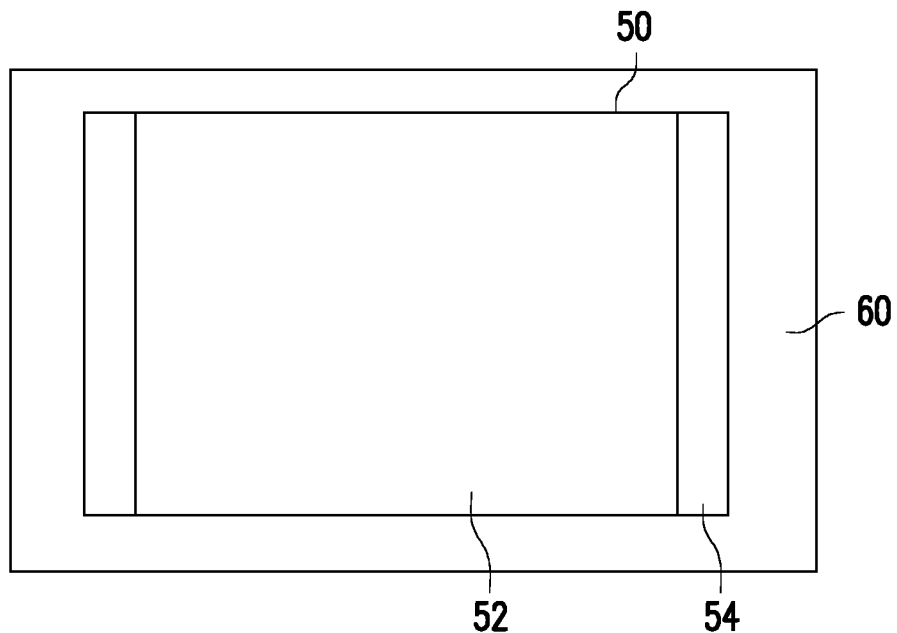
FIG. 3 is a top schematic view of a hidden optical lens in FIG. 1.

FIG. 3 is a top schematic view of a hidden optical lens in FIG. 1. Please refer from FIG. 1 to FIG. 3. It is worth mentioning that, in the present embodiment, the display element 50 further includes a control unit (not drawn) which is adaptable to adjust the light-emitting intensity of the light source through controlling the electrical parameter of the light source. Therefore, the control unit may further adjust the light-emitting efficiency of the image light emitted by the extending portion 114 through enhancing the intensity of light emitting of the edge zone 54. For example, if about 10% of the light emitted by the edge zone 54 of an edge area is transmitted toward the non-frontal direction, the availability of the light emitted by the edge zone 54 of the edge area is 90% of the original light-emitting efficiency. If the length L1 of the feature surface S2 in the horizontal direction is 3 times the width L2 of the bezel portion 62 of the frame body 60 in the horizontal direction, which means that the length L3 accounted by the edge zone 54 is two third of the length L1 accounted by the extending portion 114, then the area accounted by the light emitted by the edge zone 54 of the edge area on the extending portion 114 decreases to 67% of the original light emitting efficiency. Thus, it may be further calculated that the overall usage efficiency of the light intensity emitted by the edge zone 54 is around 60% (frontal direction 90%×area effect 67%) of the light intensity originally emitted by the edge zone 54. In other words, if the light emitted by the edge zone 54 has to supply all the covered area of the feature surface S2 and achieve the same brightness as the flat portion 112, the light-emitting intensity of the edge zone 54 may be further adjusted to become 1.66 times the light-emitting intensity of the central zone 52 through the control unit in the display element 50, so as to make the extending portion 114 and the flat portion 112 have the same brightness. In the present embodiment, if the bezel-less effect on both the left and right sides of the display surface is desired, the display element 50 may be divided into three zones which means one zone is central zone 52 and the other two zones on both sides are the edge zones 54, as shown in FIG. 3. Thus, the light emitting intensity of the edge zone 54 may be adjusted to further compensate the light-emitting efficiency of the extending portion 114 to make the display apparatus 10 have an improved display effect.

Figure 4:
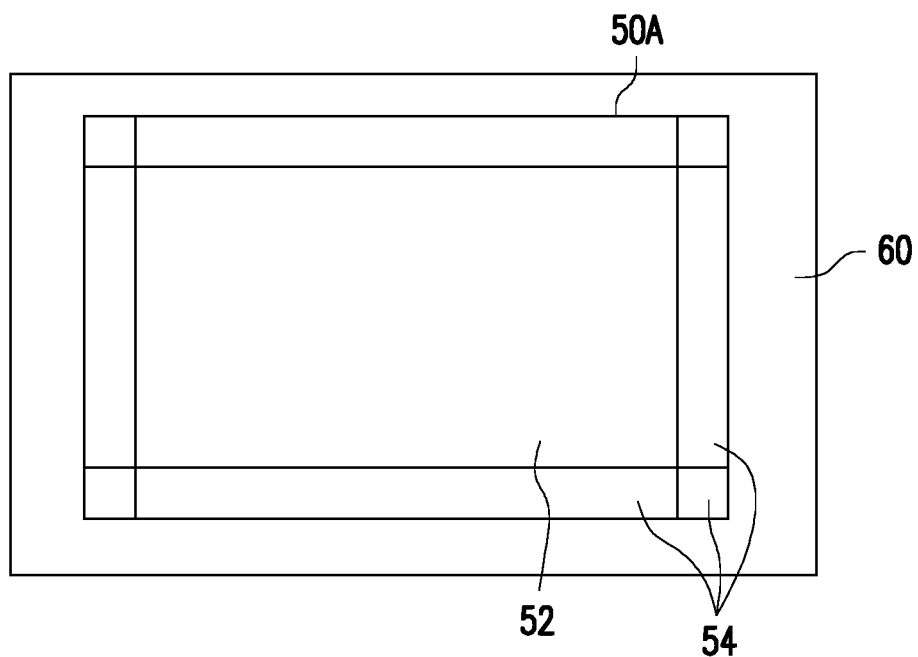
FIG. 4 is a top schematic view of a hidden optical lens in the display apparatus according to another embodiment of the disclosure.

FIG. 4 is a top schematic view of a hidden optical lens in the display apparatus according to another embodiment of the disclosure. Please refer to FIG. 2 and FIG. 4. The display element 50A of the present embodiment is similar to the display element 50 of FIG. 3, and the display element 50A of the present embodiment may be applied to the display apparatus 10 shown in FIG. 2. The difference of the two display elements lies in that, in the present embodiment, if the bezel-less effect on all the left, right, up and down sides of the display surface is desired, the display element 50A may further be divided into nine light-emitting zones, which means a light-emitting zone is the central zone 52 and the other eight light-emitting zones around the central zones are the edge zones 54, so as to further adjust the light intensity of the central zone 52 and the multiple edge zones 54 through the backlight module of the display element 50A, so as to make optical lens 100, the flat portion 112 and the extending portion 114 of the body 110 have the brightness that is similarly the same; however, the disclosure is not limited hereto. In a preferable embodiment, the display element 50A is a Micro LED Liquid-Crystal Display, and the display element 50 has more than 300 light-emitting zones. In addition, in the embodiment that the length L1 of the feature surface S2 in the horizontal direction is 4 times the width L2 of the bezel portion 62 of the frame body 60 in the horizontal direction, the principle described by the content above may be used to further calculate that the light-emitting intensity of the edge zone 54 is required be to adjusted to be 1.48 times the light-emitting intensity of the central zone 52, but the disclosure is not limited hereto.

Figure 5:
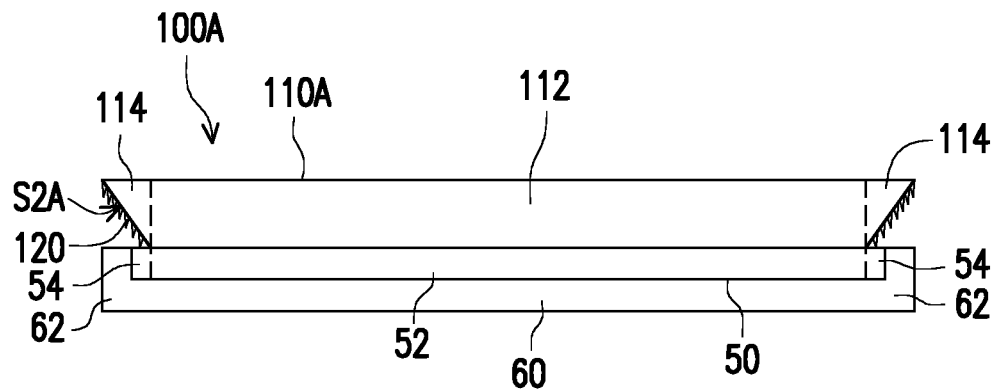
FIG. 5 is a sectional schematic view of a display apparatus according to another embodiment of the disclosure.

FIG. 5 is a sectional schematic view of a display apparatus according to another embodiment of the disclosure. Please refer to FIG. 5. The display apparatus 10A of the present embodiment is similar to the display apparatus 10 of FIG. 1. The difference of the two display apparatuses lies in that, in the present embodiment, the feature surface S2A of the extending portion 114 is a flat surface, one end of the feature surface S2A closed to the flat portion 112 is closed to the display element 50. In other words, the optical lens 100A of the present embodiment is, for example, an optical lens with its section to be trapezoid, and is disposed to the display element 50 in a full lamination method. With the refraction effect of the feature surface S2A in the extending portion 114, the optical lens 100A may make the image light emitted by the edge zone 54 enter from outside and evenly refracted to be emitted through the light-emitting surface. In the present embodiment, the material of the body 110A of the optical lens 100A may be glass or plastic; or, the flat portion 112 is glass and the extending portion 114 is plastic; or, the flat portion 112 is a combination of glass and plastic, and the extending portion 114 is plastic. The disclosure is not limited hereto.

Specifically, the feature surface S2A is a bevel extending from the juncture of the central zone 52 in the display element 50 and the edge zone 54 to the outside, and the feature surface S2A overlaps at least one edge zone 54 of the display element 50 and the bezel portion 62 of the frame body 60 in the direction perpendicular to the frame body 60. The detailed method of implementation of the ratio of the length L1 accounted by the feature surface S2A in the horizontal direction to the width accounted by the bezel portion 62 and the length accounted by the edge portion 54 of the display element 50 may be fully obtained through the content of the abovementioned FIG. 1 and FIG. 2 to conduct the implementation; therefore, the details would not be described again. In addition, the detailed implementation method of further adjusting the light-emitting intensity of the edge zone 54 to adjust the image light emitted by the extending portion 114 may also be fully obtained by the content of the abovementioned FIG. 1 and FIG. 2 to conduct the implementation; therefore, the details would not be described again. Thus, the user may experience the bezel-less visual effect.

In the present embodiment, the optical lens 100A may further includes multiple optical microstructures 120 disposed to rank on the feature surface S2A of the extending portion 114. Therefore, the image light emitted by the edge zone 54 in the refraction angle of the extending portion 114 may be further adjusted to improve the light-emitting effect of the extending portion 114. Further, the ranking density of the optical microstructure 120 on the feature surface S2A of the present embodiment is gradually increased from one end closed to the flat portion 112 to one end away from the flat portion 112. Therefore, the big-angle image light emitted by the edge zone 54 in the refraction angle of the extending portion 114 may be further improved to improve the light-emitting effect of the extending portion 114.

Figure 6:
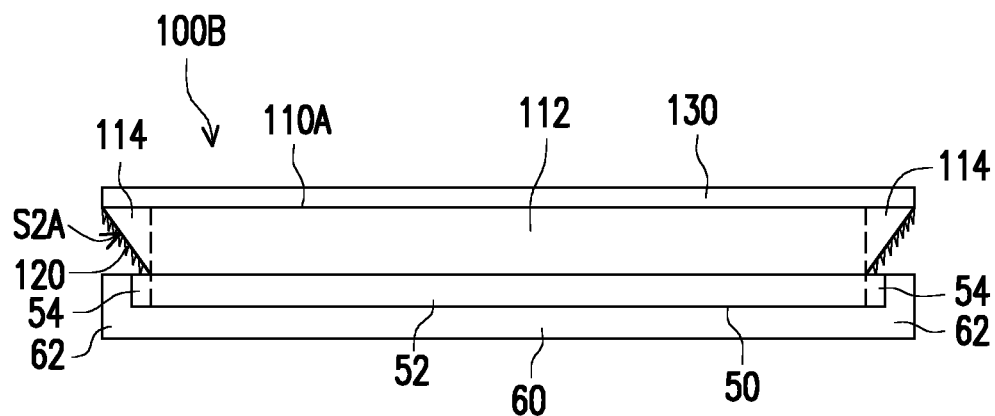
FIG. 6 is a sectional schematic view of a display apparatus according to another embodiment of the disclosure.

FIG. 6 is a sectional schematic view of a display apparatus according to another embodiment of the disclosure. Please refer to FIG. 6. The display apparatus 10B of the present embodiment is similar to the display apparatus 10A of FIG. 5. The difference of the two display apparatuses lies in that, in the present embodiment, the optical lens 100B further includes a protective layer 130 disposed to the body 110A. The body 110A is located between the protective layer 130 and the display element 50. The protective layer 130 is, for example, glass with its hardness greater than plastic. Therefore, the level of the scratch-resistance of the optical lens 100B may be improved.

Figure 7:
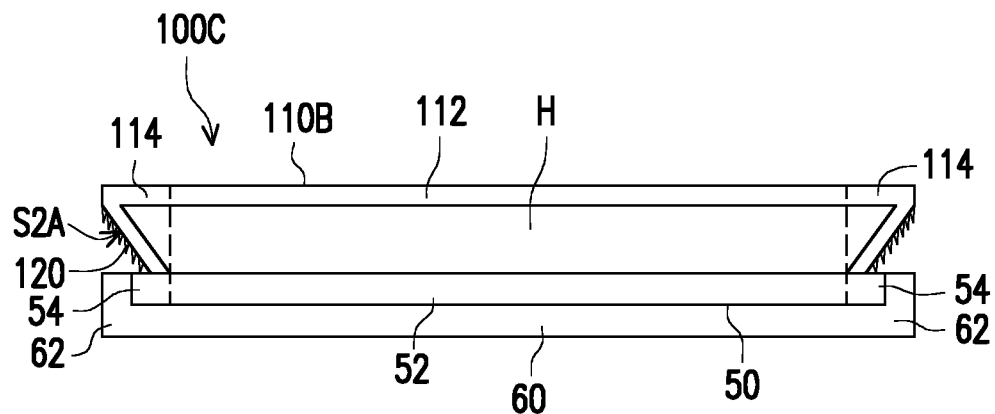
FIG. 7 is a sectional schematic view of a display apparatus according to another embodiment of the disclosure.

FIG. 7 is a sectional schematic view of a display apparatus according to another embodiment of the disclosure. Please refer to FIG. 7. The display apparatus 10C of the present embodiment is similar to the display apparatus 10A of FIG. 5. The difference of the two display apparatuses lies in that, in the present embodiment, the body 110B is a hollow structure, and there is air between the flat portion 112 and the display element 50. Therefore, the optical lens 100C may be disposed to the display element 50 in a bezel lamination method. Therefore, the weight may be further decreased and the cost may be reduced as well.

Figure 8:
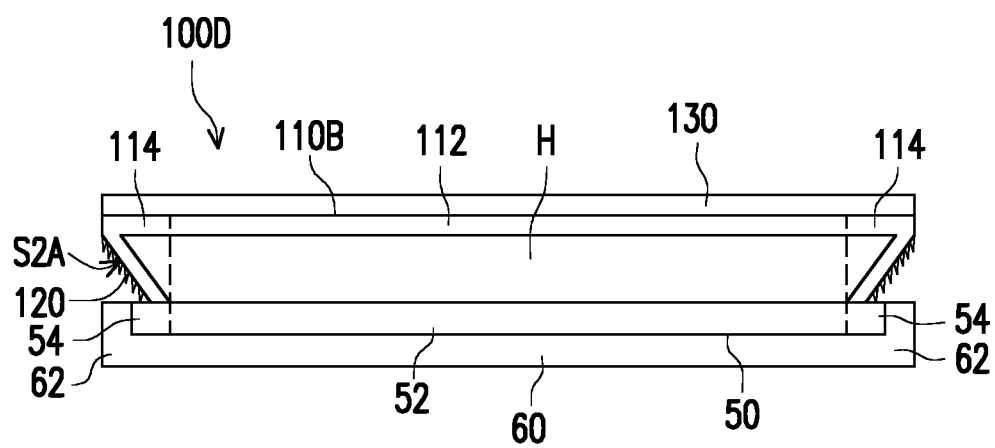
FIG. 8 is a sectional schematic view of a display apparatus according to another embodiment of the disclosure.

FIG. 8 is a sectional schematic view of a display apparatus according to another embodiment of the disclosure. Please refer to FIG. 8. The display apparatus 10D of the present embodiment is similar to the display apparatus 10C of FIG. 7. The difference of the two display apparatuses lies in that, in the present embodiment, the optical lens 100D further includes a protective layer 130 that is similar to the one shown in FIG. 6, and the protective layer 130 is disposed to the body 110B. The body 110B is located between the protective layer and the display element 50. Therefore, the level of scratch resistance of the optical lens 100B may be further improved.

Figure 9:
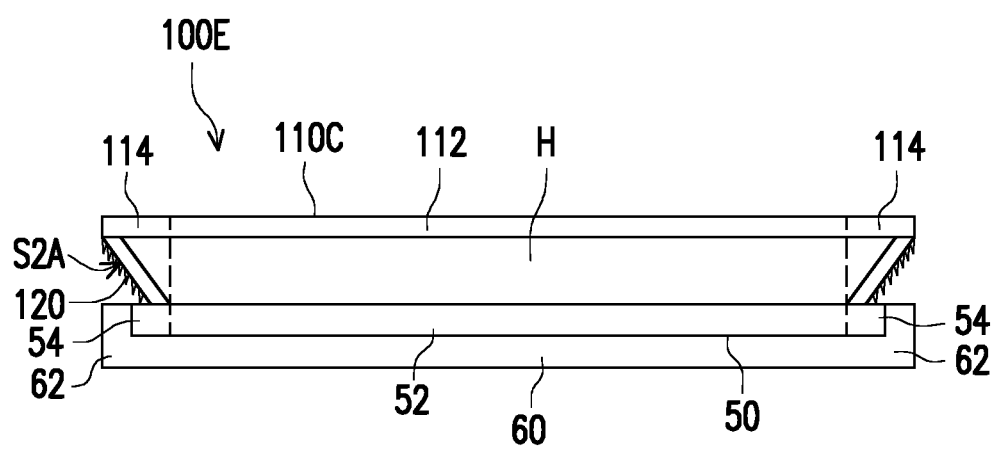
FIG. 9 is a sectional schematic view of a display apparatus according to another embodiment of the disclosure.

FIG. 9 is a sectional schematic view of a display apparatus according to another embodiment of the disclosure. Please refer to FIG. 9. The display apparatus 10E of the present embodiment is similar to the display apparatus 10C of FIG. 7. The difference of the two display apparatuses lies in that, in the present embodiment, the flat portion 112 of the body 110C of the optical lens 100E is glass and the extending portion 114 is plastic. Therefore, a good optical display effect may be further provided.

Based on the above, in the display apparatus of the disclosure, the optical lens is disposed on the display element, and the extending portion of the body of the optical lens has a feature surface, and the feature surface overlaps the edge zone of the display element and the bezel portion of the frame body in the direction perpendicular to the frame body. Therefore, the image light emitted by the edge zone may be evenly emitted by the extending portion of the body of the optical lens. Therefore, the image light may be evenly emitted through the optical lens to be transmitted to the user, so as to allow the user to experience the bezel-less visual effect.

Although the disclosure has been disclosed in the above embodiments, the embodiments are not intended to limit the disclosure, and those skilled in the art may make some modifications and refinements without departing from the spirit and scope of the disclosure. Therefore, the scope of the disclosure is defined by the claims attached below.

What is claimed is:

1. A display apparatus comprising:
   a display element having a central zone and at least one edge zone located around the central zone, and the central zone forms a display surface with the at least one edge zone, wherein the display surface emits light;
   a frame body having a bezel portion and an accommodating space, and the display element is disposed in the accommodating space and the bezel portion surrounds the display element; and an optical lens disposed on the display element, comprising a body having a flat portion and at least one extending portion located around the flat portion, wherein the at least one extending portion has a feature surface, and the feature surface overlaps the at least one edge zone and the bezel portion in the direction perpendicular to the frame body,
   wherein the length of the feature surface in the horizontal direction is 3 to 4 times the width of the bezel portion of the frame body in the horizontal direction,
   wherein the light-emitting intensity of the at least one edge zone is further adjusted to be at least 1.48 times the light-emitting intensity of the central zone, so as to make the flat portion and the at least one extending portion have a similar brightness.

2. The display apparatus according to claim 1, wherein the display element uses a Cold Cathode Fluorescent Lamp, a Mini Light-Emitting Diode, an Organic Light-Emitting Diode, a or a Micro Light-Emitting Diode as the Liquid-Crystal Display of the backlight module.

3. The display apparatus according to claim 1, wherein the display element is a Mini LED Liquid-Crystal Display, and the display element has more than 300 light-emitting zones.

4. The display apparatus according to claim 1, wherein the light-emitting intensity of the at least one edge zone and the light-emitting intensity of the central zone may be respectively controlled by a backlight module in the display element.

5. The display apparatus according to claim 1, wherein the feature surface is a curved surface, and one end of the feature surface close to the flat portion is away from the display element.

6. The display apparatus according to claim 1, wherein the feature surface is a flat surface, and one end of the feature surface close to the flat portion is close to the display element.

7. The display apparatus according to claim 6, wherein the optical lens further comprises a plurality of optical microstructures disposed to rank on the feature surface of the at least one extending portion.

8. The display apparatus according to claim 7, wherein the ranking density of the plurality of optical microstructures on the feature surface is gradually increased from one end close to the flat portion to one end away from the flat portion.

9. The display apparatus according to claim 1, wherein the body is a hollow structure, and there is air between the flat portion and the display element.

10. The display apparatus according to claim 1, wherein the body is glass.

11. The display apparatus according to claim 1, wherein the body is plastic.

12. The display apparatus according to claim 1, wherein the flat portion is glass and the at least one extending portion is plastic.

13. The display apparatus according to claim 1, wherein the flat portion is a combination of glass and plastic, and the at least one extending portion is plastic.

14. The display apparatus according to claim 1, wherein the optical lens further comprises a protective layer disposed to the body, and the body is located between the protective layer and the display element.

* * * * *